Figure 8:
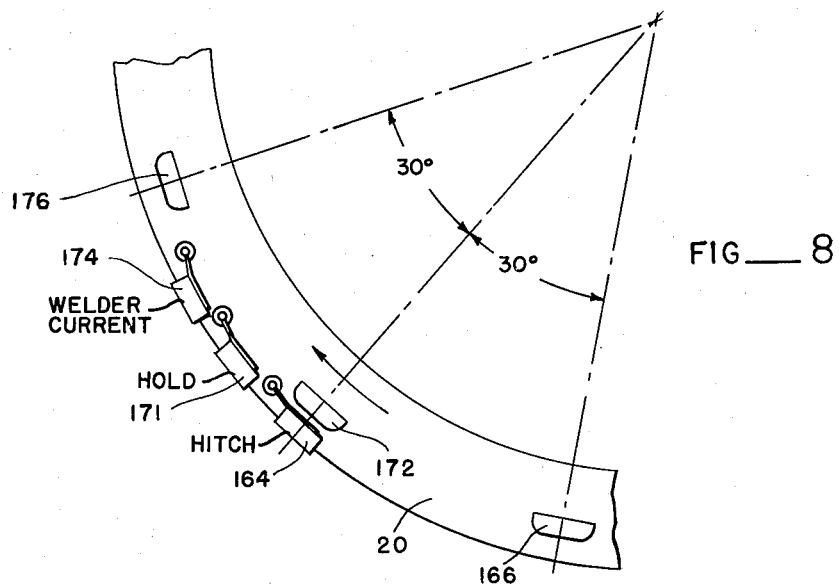

March 17, 1964 J. D. KNISELY 3,125,132
METHOD AND MEANS FOR MAKING CAGES FOR
REINFORCING CONCRETE TUBULAR ELEMENTS
Filed March 19, 1962 6 Sheets-Sheet 1
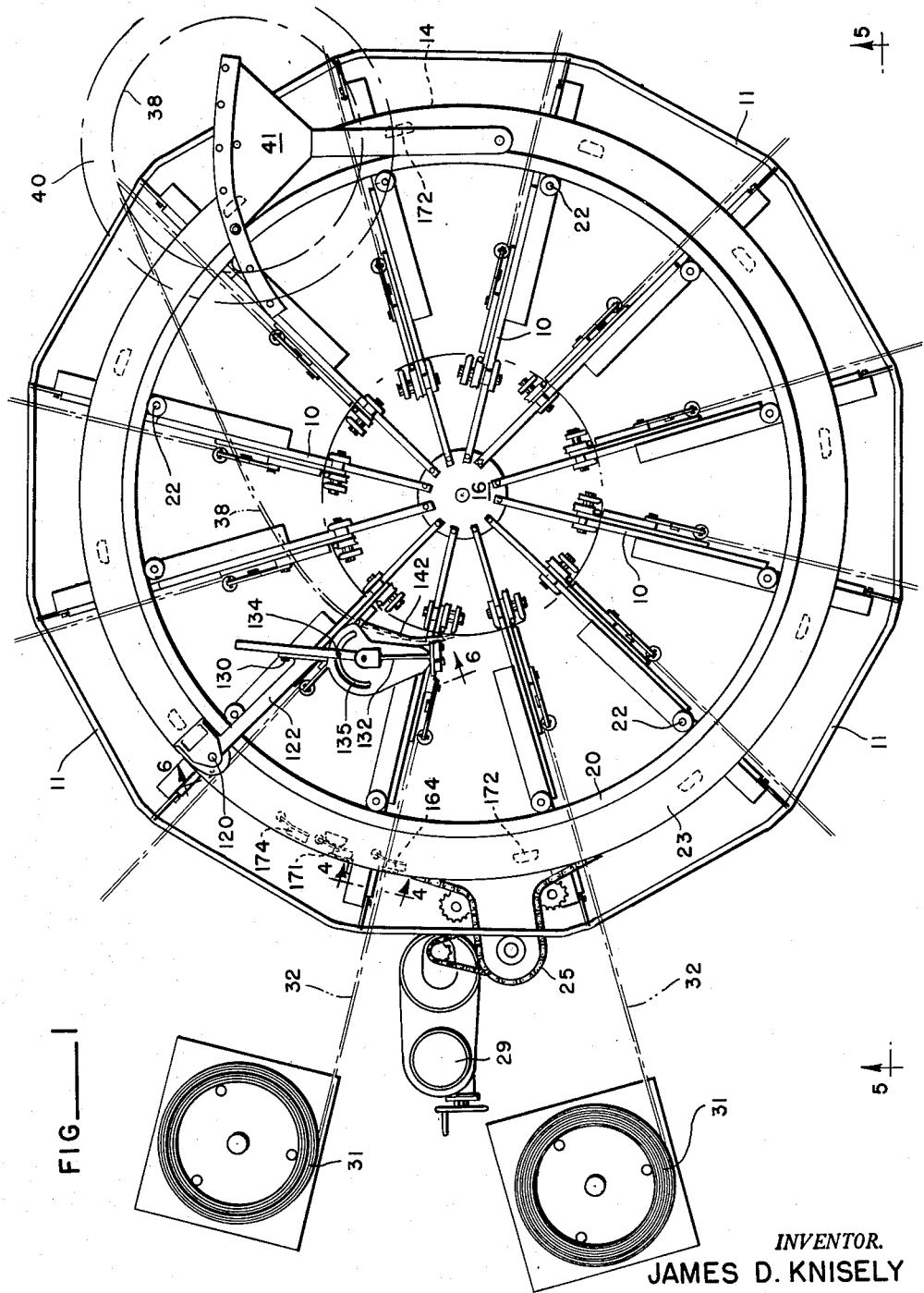
FIG—1
INVENTOR.
JAMES D. KNISELY
BY
Clarence M. Tuck
ATTORNEY

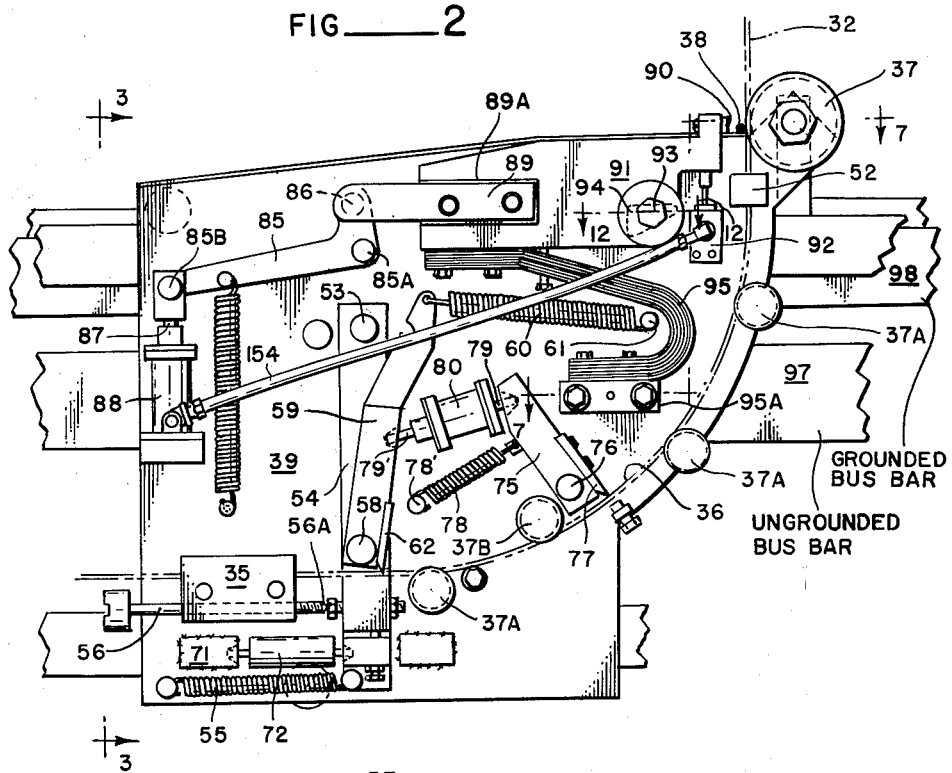

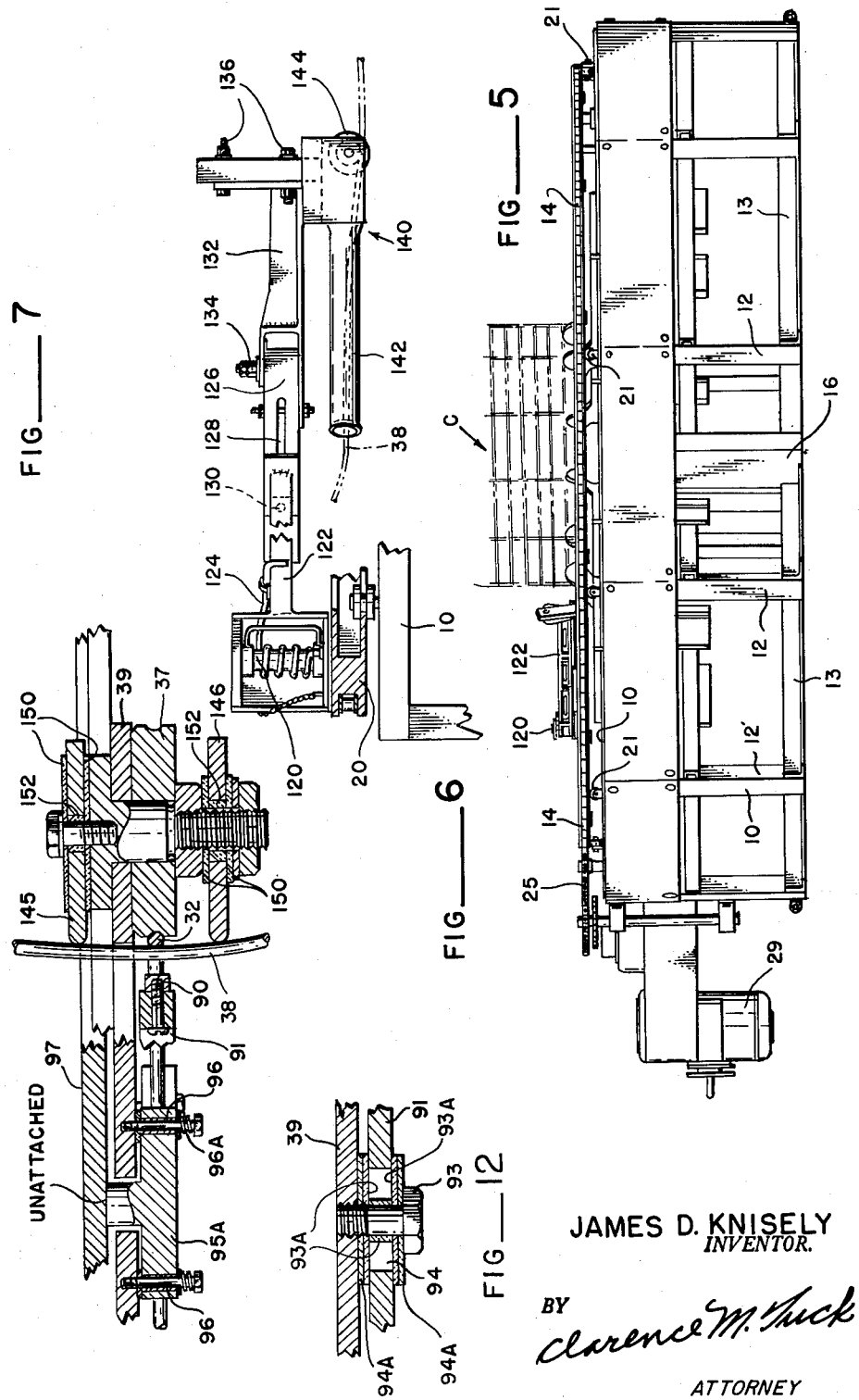

March 17, 1964 J. D. KNISELY 3,125,132
METHOD AND MEANS FOR MAKING CAGES FOR
REINFORCING CONCRETE TUBULAR ELEMENTS
Filed March 19, 1962 6 Sheets-Sheet 4

JAMES D. KNISELY
*INVENTOR.*

BY Clarence M. Tuck

ATTORNEY

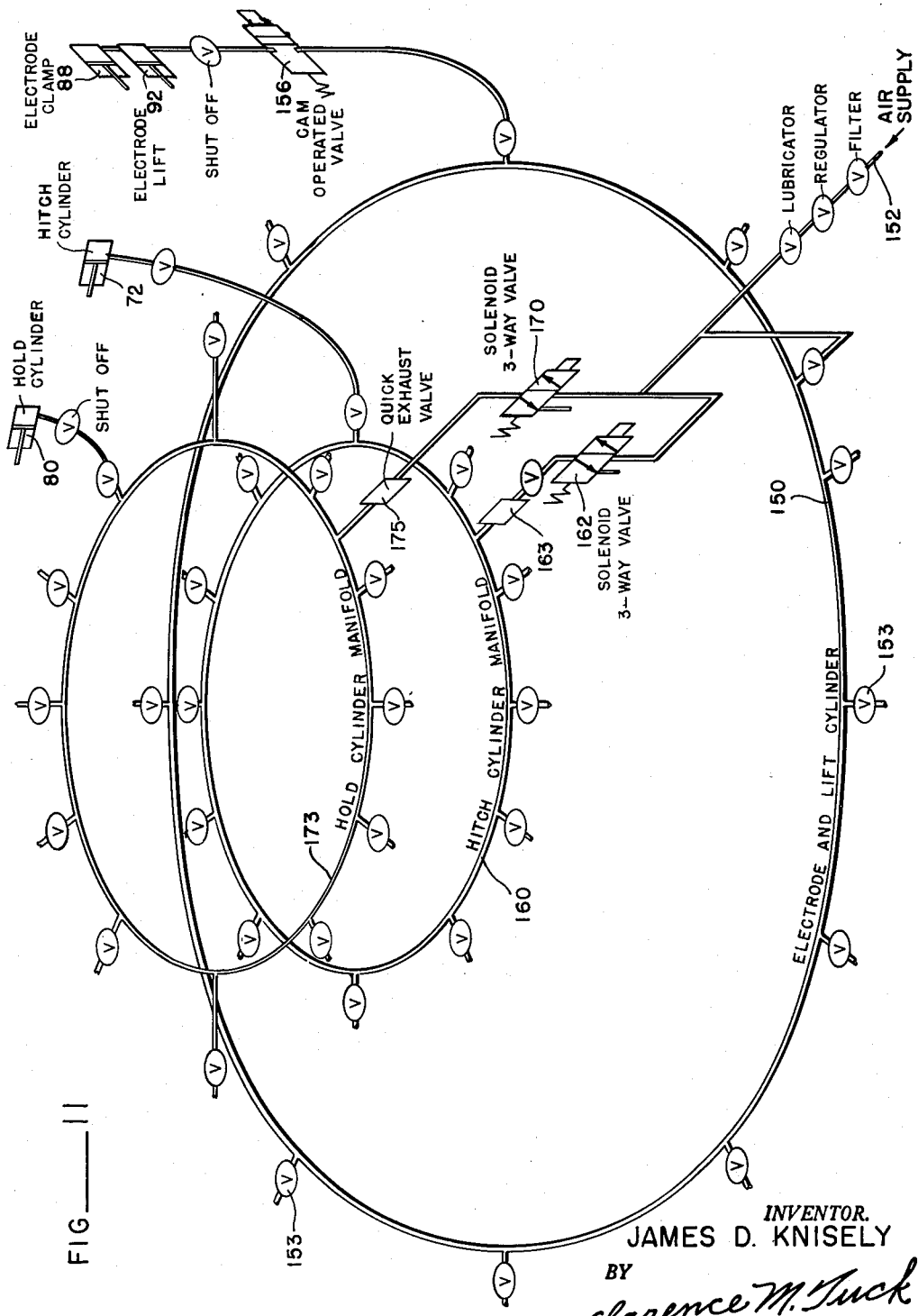

March 17, 1964  J. D. KNISELY  3,125,132
METHOD AND MEANS FOR MAKING CAGES FOR
REINFORCING CONCRETE TUBULAR ELEMENTS
Filed March 19, 1962  6 Sheets-Sheet 6

INVENTOR.
JAMES DAN KNISELY
BY
Robinson + Berry
ATTORNEYS

United States Patent Office 3,125,132
Patented Mar. 17, 1964

3,125,132
METHOD AND MEANS FOR MAKING CAGES FOR REINFORCING CONCRETE TUBULAR ELEMENTS
James D. Knisely, Houghton, Wash., assignor to George P. Duecy and Howard F. Sievers, both of Everett, Wash.
Filed Mar. 19, 1962, Ser. No. 180,636
8 Claims. (Cl. 140—71)

This present invention relates to the art of metal reinforcement of substantially round and elongated concrete elements such as columns, ducts and concrete pipe. More especially this invention relates to a method and the means for implementing the method of forming steel wire reinforcing cages in which the vertical and substantially horizontal spiral wires are quickly and precisely positioned at the time they are welded together in sequence at each of their intersections. This present application is a continuation-in-part of U.S. patent application Serial No. 39537 filed June 29, 1960, now abandoned.

The apparent desire to decentralize industrial activity has brought about the use of many areas of land which formerly were not considered suitable for manufacturing plants and the housing and utilities which such plants draw to them. It therefore has become increasingly more important to drain areas where the ground is naturally unstable. This requires a new order of concrete pipe, one that is adequately reinforced with steel so that it can properly and fully resist the minor changes in elevation to which parts of the individual joints or a section of pipe may be subjected. It therefore becomes increasingly more desirable to provide reinforcing wire cages made of the larger sizes of wire and which can be quickly and expeditiously welded together at each of their crossings. These crossings of wire occur very frequently in the manufacture of the type of cages to which this application and its parent application Serial No. 39,537 apply.

It is believed that the teachings of this present application have resulted in a marked improvement in the welded-together cages for reinforcement of pipe. The wire feeding mechanism has been constructed so as to feed vertical wires in a step-by-step method that greatly assists in making the welded joints which occur so close together in a reinforcement cage of this order that very little time is available for the welding of the joint. Consequently, it is desirable to have the wires in as stable a condition as possible so that the momentary time required for the fusing of the wires together can be adequately assured so that strong welded joints will result.

A principal object of this invention therefore is to provide a method and means for implementing the method whereby the various wire components making up the reinforcing cages are accurately positioned prior to being welded together and are held firmly in position during the welding period so that a maximum strength of the weld can be achieved.

A further object of this invention is to provide a method of fabricating a concrete reinforcing wire cage by means which will insure that during the forming operation the revolved mass will be reduced to a minimum.

A further object of this invention is to provide a method and implementing means which enables the production of reinforcing cages which are not circular but which may be elliptical in form, for instance, so that fullest advantage can be taken of pre-stressing the concrete pipe as it is being manufactured.

A further object of this invention is to provide means whereby, with the minimum of mechanism, the various steps essential in the manufacture of wire cage reinforcing can achieve the sequential operation required.

A further object of this invention is to provide the means whereby feeding the vertical wires, the positioning of the wires and the final welding of the same in place can all be fabricated within a relatively thin, flat space to the end that a plurality of these mechanisms can be radially disposed around the center of the machine so that a large number of vertical wires can be handled without interference of the component parts and so that one wire unit with its associated mechanism will not interfere with adjacent units of a similar character.

Figure 9:
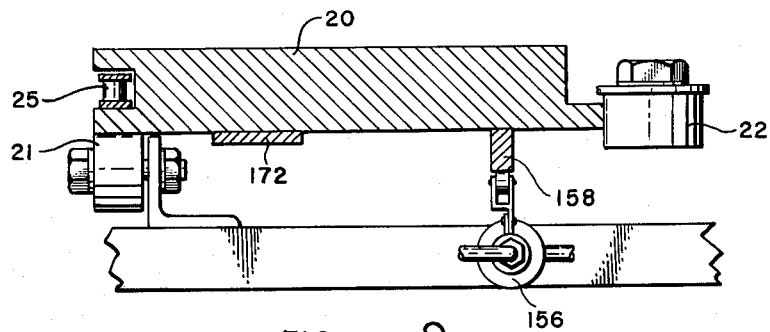
Figure 10:
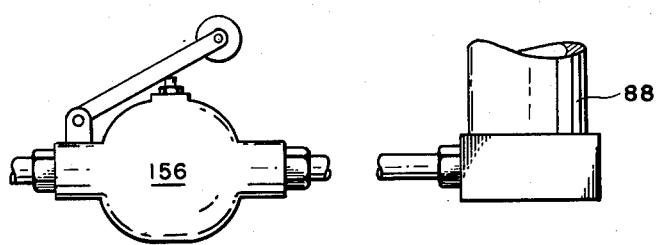
Figure 13:
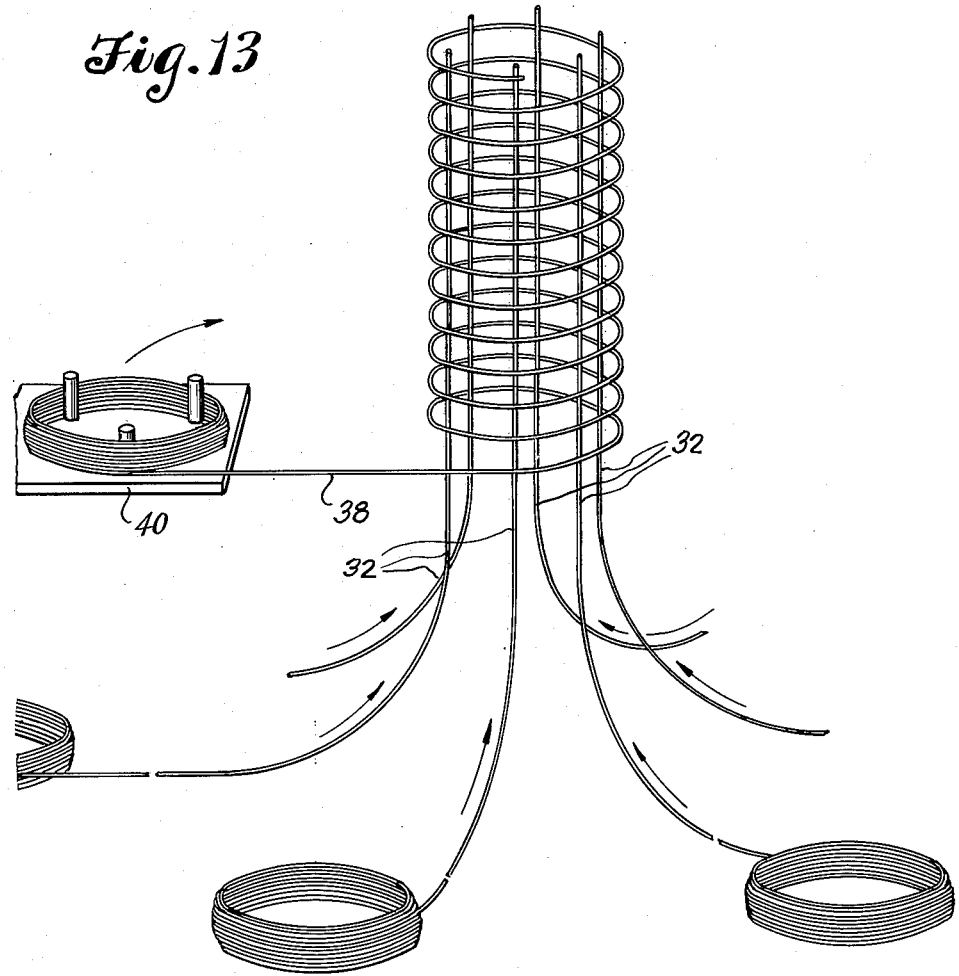

In the drawings:
FIGURE 1 is a top plan view of the main frame structure suitable for making reinforcing wire cages after the teachings of this present method.
FIGURE 2 is a side elevation of one of the vertical wire handling and welding mechanisms.
FIGURE 3 is a cross-sectional view taken along the line 3—3 of FIGURE 2.
FIGURE 4 is a typical fragmentary side elevation showing the location of certain micro-switches and the cams associated therewith, certain parts being shown in section.
FIGURE 5 is a side elevation of my main frame structure and illustrating a wire cage partially completed thereon.
FIGURE 6 is a fragmentary sectional view partly in elevation as taken along the line 6—6 of FIGURE 1 and showing the guide means employed for positioning the spiral wire.
FIGURE 7 is a fragmentary sectional view in a horizontal plane and showing the juncture between the vertical wire and the horizontal wire and the parts associated with the positioning, holding and welding of these two together.
FIGURE 8 is a diagrammatic view illustrating the three micro-switches for each vertical wire unit and the relative position of the cams which successively energize them.
FIGURE 9 is a fragmentary sectional view in elevation showing the annular rotary carrier and the cam for operating air controlling valves for the electrode lift and clamp means.
FIGURE 10 is a side elevation of one of the air valves and showing the bar and roller means for operating the valve.
FIGURE 11 is a diagrammatic view of the disposition of the valve showing the three main air supply manifolds for operating the machine.
FIGURE 12 is a fragmentary sectional view along the line 12—12 of FIGURE 2.
FIGURE 13 is a diagrammatic view, in perspective, showing a reinforcing cage structure as produced by this method and apparatus.

Referring to the drawings, throughout which like reference characters indicate like parts, reference is made to FIGURE 1 in which the machine is shown to be substantially circular in plan, comprising a plurality of frame structures 10 arranged radially about the common axial center of the machine at approximately equally spaced intervals. At their outer ends these frame structures are rigidly joined together by the tie plates 11. Each radial frame structure 10 comprises a vertical structural member 12 at both their inner and outer ends and according to the size of the machine may have intermediate leg members 12'. Suitable horizontal structural members 13 are employed to give stability and rigidily to the main frame 10 of this machine and its upper deck or table 14. All parts of this main frame are arranged about a central housing 16 and further shown in FIGURE 5. The welding transformer is secured within housing 16 and is not illustrated as it is a conventional low voltage, high amperage type.

Referring to FIGURE 1, which shows the machine in top plan view, an annular carrier ring 20 is shown mounted concentrically with housing 16 and mounted for rotation upon the main frame structure 10. Carrier 20 is suitably supported, preferably by rollers 21 underneath the revolving member but, as any suitable supporting means may be employed, these rollers have not been shown in detail. The supporting rollers and guide or positioning rollers are shown generally in FIGURE 9. The inside edge of the annular carrier 20 is guided by a plurality of vertical rollers 22 which are normally mounted one at each of the radial frames. Supported concentrically of and upon the annular carrier ring 20 about its outer edge is an annular drive groove means 23 which provides an outwardly opening groove for the driving belt 25, preferably formed as a continuous sprocket chain that extends outwardly from a channel and is suitably driven by sprocket means energized by the electric motor 29. Some convenient revolving means is provided for feeding the vertical wires 32 from the wire coil 31. These coils are stationary; consequently they can be placed at any convenient location as long as the wire can be fed to the wire feeding means without undue friction.

Wires 32 are fed, one to each of the mechanisms shown generally in FIGURE 2, there being one such assembly for each of the various vertical wires employed in the particular cage being made. The wire 32 first passes through guide block 35 and then is guided, as by a plurality of rollers 37a and 37b, so as to engage the arcuate wire guide rail 36. The wire, assisted by the revolvable guide members as 37a, passes upwardly through a vertically apertured guide block 52 and is thus accurately guided into contact with the outside edge of a circumferentially grooved, horizontally mounted, circular electrode 37 which is probably best shown in FIGURES 2 and 7. It is to be understood, particularly from a study of FIGURE 2, that the various parts making up a single wire guiding and feeding mechanism as shown in FIGURE 2, are secured to a single station backing plate 39 so that these various parts will be accurately positioned to insure their workability, one with another. It is to be further understood that there is one assembly such as shown in FIGURE 2 used with each of the vertical wires forming the reinforcing cage and this number naturally will vary in accordance with the size of the cage. It is believed desirable to point out that any reasonable number of these mechanisms may be radially disposed about the axis of revolution of the machine and for this reason it is very desirable to keep the assembly as thin, as viewed transversely to a radial plane of the machine, as the need for functioning will permit.

At the start of a cage structure making operation, the various vertical wires needed are reeved through the mechanism, of the type shown in FIGURE 2, at as many stations as are required to form the desired cage. In order that these vertical wires may be engaged by the horizontal wire 38, each of the vertical wires should project slightly above the guiding electrode 37 at each station. After the operation is started each rotation of the carrier 20 will cause the individual feed mechanisms of FIGURE 2 to advance each of the vertical wires a predetermined distance which represents the spacing between the substantially horizontal spirally wound wire 38.

With each rotation of the annular carrier 20, which carries wire 38 in a coil for dispensing as the need arises, the horizontally disposed wire 38 is wound spirally once about the vertical strands 32, thus progressively building up the cage C as is indicated in FIGURE 5. The spiral forming wire 38 is drawn from a rotatable spool 40 which is supported for rotation on an adjustable base 41 mounted on the carrier ring 20 and rotates therewith about the vertical axis of the main frame. Since the group of vertical wires 32 have no rotary movement while spool 40 does rotate with the annular carrier 20, it is believed apparent that the wire 38 initially drawn from the spool and fixed at its free end to one of the vertical strands 32 of the cage, will be caused to form spirally about the vertical strands as they progressively advance upwardly with the rotation of the carrier 20. It will be further understood that by placing the spool 40 under certain required unwinding tension, the wire 38 will be caused to be drawn tightly against the vertical wires 32 as the cage is formed.

The means for feeding the vertical wires 32 into the machine will now be described and since the means employed for each strand is like the others, only one of the feeding mechanisms as seen in FIGURE 2 will be described in detail but with the understanding that this description applies equally to all the remaining other identical mechanisms employed with each individual vertical wire.

The end of wire 32, as previously explained, is through guide means until it passes the grooved electrode 37 which is capable of adjustment around its clamping bolt to bring new arc positions into use as they become burnt in use. It is very desirable that the wire 32 engage the groove of the wheel electrode 37. Wire 32 is fed along the arcuate guide bar 36 by the step-by-step movement of the hitch gripper plate 62 and the step-by-step holding provided by hold gripper plate 77. The functioning of these parts will be explained in greater detail. A depending bar 54 swings on pivot 53 which is secured in plate 39. This depending bar 54 is provided with a threaded bolt 56 which passes through guide block 35, thus providing an adjustable stop which abuts bolt 56a in bar 54 on the left side of the lever, as viewed in FIGURE 2. At its lower end the depending bar 54 is provided with an air cylinder 72 which is supplied with air from a source not illustrated. This cylinder functions only in one direction as it extends the coil spring 55 by moving the lower portion of bar 54 to the right as viewed. An abutment is provided at 71 for cylinder 72 and this abutment is in turn secured to plate 39.

Pivotally secured to bar 54 at 58 is a lever arm 59. This arm has fixedly secured to it the hitch gripper plate 62 disposed to intermittently engage and advance wire 32 and it is normally forced into engagement with the wire by the tension spring 60, one end of which is secured at 61 to plate 39. The lever arm 75 which is pivoted at 76 to plate 39 operates alternately with arm 59. This arm has the hold gripper plate 77 secured to it and it is beveled, similarly to plate 62, into a knife edge so as to alternately engage wire 32 by biting into it and thus insures that there will be no retrograde movement of the wire. Gripper plate 77 is normally revolved about pivot 76, achieving a new hold on the wire by the single acting piston 80 which is repositioned after each use in moving arm 75 to the right as viewed, by the tension spring 78 which is secured to arm 75 and anchored at its opposite end under tension at 78' to plate 39. At its upper end lever arm 75 is provided with a rest for the piston rod 79 of cylinder 80 and the other end of the cylinder 79' is similarly engaged by lever arm 59. As air from a suitable source is introduced into cylinder 80 it pushes out one of its piston rods 79 and as the other end of cylinder 80 is anchored to arm 59, it has the effect of spreading apart the upper end of lever arm 75 and lever arm 59 so that in both cases their respective springs 78 and 60 are placed under tension. These springs in turn provide for the return movement of their respective arms. Gripper plate 77 actually holds the wire 32 in its upward position at the end of its feeding cycle and spring 60 moves the gripper plate 62 rearwardly or to the left on wire 32 so that it will engage the same to complete the step-by-step operation provided by plates 77 and 62. The repositioning of gripper plate 77 on wire 32 is effected by the force applied by air cylinder 80 which forces the gripper plate 77 to press wire 32 against guide 36 until it is restrained by the impossibility of revolving plate 77 further about pivot 76.

When the wire 32 has progressed far enough to be in position with respect to the spiral wire 38 so that a weld should be made the functioning of the positioning, holding and welding mechanism occurs. The revolvable electrode 37 is one of the elements of this mechanism. The coacting electrode 90, which is secured to the electrode block 91, assists in making a tight juncture between wires 32 and 38 and, when the electric current is supplied, provides one of the electrodes making the arc weld. In FIGURE 2 electrode block 90 is shown in its uppermost position which it occupies for approximately 1/100 of a cycle. It is raised to the position shown by the piston rod of air cylinder 92, which cylinder in turn is secured to plate 39. This provides accurate positioning of the electrode 90 and insures the precise positioning of the various parts at the time the weld takes place. As soon as the weld is completed the electrode 90 and block 91 are retracted downwardly by air cylinder 92 so that they lie below the surface of the table 14, which is in FIGURE 5 and as removed in FIGURE 1, and is thus out of the way of the wire 38 as it must sweep across the top of the table as ring 20 and wire coil 38 are revolved. The opposite end of block 91 is provided with arms 89, one on each side of 91. The arms are insulated from block 91 by suitable insulation 89a. The arms are fixedly secured to block 91 and in turn are pivoted on a moving pivot 86 which is part of the bell crank 85. Bell crank 85 is pivoted on the fixed pivot 85a and the opposite end of the bell crank is pivoted at 85b to the piston rod 87 of the air cylinder 88. A flexible tube 154 connects the cylinder 88 and cylinder 92.

In order to supply the current carrying capacity required for the weld a flexible laminated connector member 95 is employed. This is fixedly secured to anchor 95a which in turn is secured to plate 39 and its opposite end is secured to electrode block 91. Electric current is conducted to the copper block 95a by means of bus bars 97 and 98. This is shown in FIGURE 7. Copper block 95a is insulated from plate 39 by suitable means. Short compression springs 96a are employed to insure a contact with the ungrounded bus bar 97. When air is introduced into cylinder 88, the upwardly extending piston rod 87 is raised, thus moving the moving pivot 86 of the bell crank 85 to the right, as viewed in FIGURE 2. This is the positioning means that moves the electrode 90 to the right into clamping position on wire 38 just prior to the striking of the welding arc.

The guide and positioning means for block 91 is illustrated in FIGURE 12. This shows the clearance 94 and insulation of dielectric material 93a and two washers of felt 94a used to arrest sparks from the welding operation.

In the placing of the various convolutions of wire 38 about the vertical wires 32, each of the convolutions is drawn into position against wires 32 slightly above the top level of block 91. Therefore, to be accurately and uniformly positioned, wire 38 must be pushed down into a definite position as established by a horizontal stop member. In my new improved form of this equipment I have made a radical departure from the mechanism employed previously in my co-pending application Serial No. 39,537. It became apparent that it was very desirable to have a simpler arrangement to facilitate the changing from one sized wire or one sized cage to another and the arrangement shown in FIGURES 5, 6 and 7 makes this possible of achievement with a very minimum waste of time. Further, because of the closeness of the parts to their bearing points and their points of support, the new equipment is rigid and holds the spiral wire 38 down and against the vertical wires so that a uniform series of welds can be achieved.

My new mechanism is pivoted to the annular and rotating coil carrier 20 by means of pin 120 and its supporting bracket. This pivot pin and its relationship to the top of my machine is best illustrated in FIGURES 1 and 6 in which an arm 122 is pivoted on pivot 120 and is biased by the torsion spring 124 to swing the opposite end 126 of bar 122 inwardly toward the center of the machine. It will be noticed that a slot is provided at 128 so that by loosening, adjusting and then tightening bolt 130, the usable length of bar 120 can be adjusted to meet the conditions at hand and this will generally refer to a change in diameter of the reinforcing cage under construction. Adjustably positioned with respect to bar 122 is a bracket member 132 which is adjustably positioned angularly with bar 122 and locked in position by the clamp bolt 134, this bolt operating in a slot concentric with bolt 134 which is shown at 135 in FIGURE 1. Adjustably secured as by means of bolts 136 is a wire guide member 140. This member has a tubular portion 142 through which the spiral wire 38 passes. As will be noted in FIGURE 1, tube 142 is arcuate in form so as to give the wire 38 a general bend quite near the point where it is brought in contact with the vertical wires. The pressure element which holds the wire down is the grooved wheel 144.

Referring to FIGURE 7, a view at right angles to that of FIGURE 2, is shown. The electrode wheel 37 is shown in section, together with the forming plates 145 and 146 which give wire 38 its final curvature to equal the normal curvature of cage C. These forming plates are insulated by dielectric discs and bushings, 180 and 182 respectively, from the bus bar 97 and adjustably positioned electrode wheel 37.

Referring to FIGURE 11, the air manifolding for actuating the various operations is illustrated in diagrammatic form for ease of understanding what at first may seem involved. Actually air under pressure is needed under three timing programs at each station where welding takes place. If it is assumed that a machine is to have twelve stations, each would have an air connection from one air valve from each manifold. On the upper right hand corner of FIGURE 11 there is shown an air line connected through a manually operated valve from the respective manifolds to the apparatus as it is operated. These take-off air lines occur at each of the valves, shown by symbols on each of the three manifolds.

The electrode clamp and lift cylinder manifold 150 is supplied with air under pressure from supply line 152 and in turn supplies air to each of the stations used. If only six stations were used to produce a cage having six vertical wires, every alternate valve 153 would be manually closed. Of the six stations used, air is supplied to cylinder 88 of each station. Air is conducted through tube 154 to cylinder 92 to operate the clamp mechanism 85, 89, 91 and cylinder 92 operates the lift which raises electrode block 91. Air pressure is built up in manifold 150 by direct connection to air supply line 152 and to each station's electrode clamp and lift cylinder by one of the 12 cam operated valves 156, each of which is operated one for each revolution of the annular ring 20 by the single cam 158 shown in FIGURE 9.

The hitch cylinder manifold 160 actuating cylinder 72, is supplied with air from an extension of supply line 152 through the solenoid valve 162 indicated in FIGURE 11. A quick exhaust valve 163 is employed to assist in scavenging low pressure air from the manifold. The solenoid valve in turn is engaged by the fixed micro-switch 164 actuated by cam 166 mounted upon the revolving annular ring 20.

The hold cylinder manifold 173 having a quick acting valve employed for actuating cylinder 80 also obtains its air under pressure from line 152 through solenoid valve 170 which valve is energized by micro-switch 171. The stationary switch 171 is actuated by cam 172 carried by ring 20. The welder current is supplied by the fixed micro-switch 174, actuated by cam 176 mounted on the revolving ring 20.

For further clarification a brief statement of the wire handling means follows.

The vertical wires 32 are each drawn from their stationary but revolvable coils 31 and pass through the guides 35 impinging on the arcuate wire guides 36. Here they are each engaged by the hitch gripper plates 62 due to the action of the springs 60, which partially revolve the lever arms 59 about the pivots 58 and cause the blade portions of the plates to nick and thus firmly engage the wires 32. Pivots 58 are secured to the depending bars 54 which are pivoted at 53 to the plates 39. Air is then introduced, as described, into the air cylinders 72, thus moving the bars 54 and their attachments to the right as viewed in FIGURE 2 and carrying wires 32 along up the guides 36.

At the end of their stroke each hold gripper plate 77 engages and nicks the wires 32 under urgence of the springs 78 and air cylinders 80 and thus are able to hold the wires in place while the hitch plates are moved to the left, as viewed, to re-engage the wires 32 for a repeat cycle as just described. The cylinders 72 are designed for one way operation and the retraction of the bars 54 is achieved by the tension spring 55 and the hitch plates 62 are repositioned for the next cycle by the tension springs 60. The movement of wire 32, and similarly all the wires 32 being used, is advanced an amount equal to the distance between each turn by this one step-by-step movement.

The blocks 91 are raised at the end adjacent wires 32 and 38, by the air cylinders 92 and also moved to the right by the air cylinders 88, the bell cranks 85 and the arms 89 to cause the electrodes 90 to clamp the wires 38 to the wires 32. At the conclusion of this clamping action the weld is made.

In considering the micro-switches and their actuating cams, reference is made to FIGURES 1 and 8. There are three non-revolving micro-switches spaced in the order shown in FIGURE 8 to provide the desired sequence of action. However there is a separate cam for each vertical wire station and these are all on the same radius and all trip all three micro-switches on each revolution of annular ring 20 as they pass them. Welding can occur only when wires 32 and 38 are in contact as shown in FIGURE 1 and in enlarged scale in FIGURES 7, as their actual contact is required to complete the welding circuit. The numbering of cams 166, 172 and 176 may be applied in this order to any three adjacent cams and is used in an attempt to clarify a rather complex operation.

It is believed that it will be clearly apparent from the above description and the disclosure in the drawings that the invention comprehends a novel construction of a method and means for making cages for reinforcing concrete tubular elements.

Having thus described my invention, I claim:

1. A method for making wire cages for reinforcement of concrete structures comprising longitudinally guiding a plurality of cage wires from sources of supply thereof into a generally circular pattern in which each of said wires is vertically disposed, positively advancing said wires intermittently, to cause said vertically disposed wires to move upwardly in equal increments, winding a cage wire about said circular pattern of vertical wires to cause the wire which is wound to contact said upwardly moving vertically disposed wires, one by one, in a helical pattern, separately clamping said wound wire against each of said vertically disposed wires where they contact one another and welding said wound wire to said vertically disposed wires at said points of contact and while the same are clamped together.

2. A method for making wire cages for reinforcement of concrete structures comprising longitudinally guiding a plurality of cage wires from separate sources of supply thereof into a generally circular pattern in which each of said wires is vertically disposed, positively advancing said wires individually and in a longitudinal direction, intermittently, to cause said vertically disposed wires to move upwardly in equal increments, winding a cage wire about said circular pattern of vertical wires to cause the wire which is wound to contact said upwardly moving vertically disposed wires, one by one, in a helical pattern, separately clamping said wound wire against each of said vertically disposed wires where they contact one another, one by one, said clamping being effected promptly following said contact, and welding said wound wire to said vertically disposed wires at said points of contact, one by one, and while the same are clamped together.

3. Apparatus for making wire cages for reinforcement of concrete structures comprising means to longitudinally guide a plurality of cage wires from sources of supply thereof into a generally circular pattern in which each of said wires is vertically disposed, means to positively advance said wires individually intermittently, to cause said vertically disposed wires to move upwardly in equal increments, means to wind a cage wire about said circular pattern of vertical wires to cause the wire which is wound to contact said upwardly moving vertically disposed wires, one by one, in a helical pattern, clamping means associated with each vertically disposed wire to clamp said wound wire against each of said vertically disposed wires where they contact one another and welding means including said clamping means to weld said wound wire to said vertically disposed wires at said points of contact and while the same are clamped together.

4. Apparatus for making wire cages for reinforcement of concrete structures comprising means to longitudinally guide a plurality of radially spaced cage wires from a plurality of wire supply reels through a curved path upwardly into a generally circular pattern in which each of said wires is vertically disposed, means to grasp and positively advance said wires individually and intermittently to cause said vertically disposed wires to move upwardly in equal increments, annular means revolvable around said vertically disposed wires to wind a cage wire about said circular pattern of vertical wires to cause the wire which is wound to contact said upwardly moving vertically disposed wires, one by one, in a helical pattern, radially mounted clamping means associated with each of said vertically disposed wires to clamp said wound wire against each of said vertically disposed wires where they contact one another, welding means including said clamping means associated with each of said vertically disposed wires to weld said wound wire to said vertically disposed wires at said points of contact and while the same are clamped together, and means actuated by revolution of said annular means to operate said wire advancing means, said clamping means and said welding means.

5. The combination according to claim 4 in which said wound wire is guided by vertically pivoted adjustable guide means carried by said annular means and biased toward said vertically disposed wires.

6. The combination according to claim 4 wherein said wire advancing means, comprise: a hitch gripper plate for moving the vertical wire in a step-by-step manner along an arcuate path and a hold gripper plate to engage said vertical wire and hold it against retrograde movements at the end of each stroke of said hitch gripper plate and air cylinder and companion tension spring means for sequentially operating said wire advancing levers.

7. The combination according to claim 4 in which said welding means comprise: a grooved electrode adjustably secured to said mounting plate for engaging said vertical wire; an electrode block slidably secured to said mounting block and capable of limited horizontal and vertical movement; an electrode for engaging said horizontal wire, secured to said electrode block; air cylinders secured to said mounting plate and tension spring means secured at one end to said mounting plate for timing and moving said electrode block to effect coaction with said grooved electrode to effect the welding of said vertical and said horizontal wires together; a laminated welding current conductor in the form of a U to supply electric current during the welding operations and a source of air under pressure to operate said air cylinders.

8. The combination according to claim 6 further provided with a substantially vertically disposed depending bar pivotably secured at its upper end to said mounting plate; a lever arm pivotably secured at its lower end to said depending bar adjacent its lower end; said hitch gripper plate secured to said lever arm adjacent its pivot and having a sharpened lower edge to engage and nick said vertical wire; said hold gripper plate secured to a lever arm pivotably secured adjacent its lower end to said mounting plate, said hold gripper plate disposed to engage said vertical wire at the end of each forward movement of said vertical wire and hold it against retrograde movement; said air cylinders and tension springs secured at one of their ends to said mounting plate disposed for the step-by-step actuating of said hitch gripper plate and said hold gripper supporting levers.

References Cited in the file of this patent

UNITED STATES PATENTS

| | | |
|---|---|---|
| 1,871,751 | Sherwan et al. | Aug. 16, 1932 |
| 2,000,788 | Reed | May 7, 1935 |
| 2,040,349 | Wagner | May 12, 1936 |
| 2,050,832 | Edwards | Aug. 11, 1936 |
| 2,137,257 | White | Nov. 22, 1939 |